April 29, 1924.

H. F. SCHMIDT 1,491,824

HOT WELL EJECTOR

Filed Dec. 31, 1920

WITNESSES:
R.E.B. Wakefield

INVENTOR.
Henry F. Schmidt
BY D.C. Davis
ATTORNEY

Patented Apr. 29, 1924.

1,491,824

UNITED STATES PATENT OFFICE.

HENRY F. SCHMIDT, OF SWARTHMORE, PENNSYLVANIA, ASSIGNOR TO WESTINGHOUSE ELECTRIC AND MANUFACTURING COMPANY, A CORPORATION OF PENNSYLVANIA.

HOT-WELL EJECTOR.

Application filed December 31, 1920. Serial No. 434,355.

*To all whom it may concern:*

Be it known that I, HENRY F. SCHMIDT, a citizen of the United States, and a resident of Swarthmore, in the county of Delaware and State of Pennsylvania, have invented a new and useful Improvement in Hot-Well Ejectors, of which the following is a specification.

My invention relates to fluid ejecting devices and has for its object to provide an apparatus of the character designated which shall be capable of simultaneously ejecting fluids of unlike densities and which shall be particularly adapted for use in removing air and condensate from a condenser.

These and other objects are obtained by means of apparatus embodying the features of my invention herein described and illustrated in the drawings accompanying in which—

Ejectors are frequently employed for removing the air and other non-condensable gases and vapors from a condenser, and in some installations an ejector is also provided for removing the condensate. In carrying out my invention I preferably unite the ejector for removing the air and gases, and the ejector for removing the condensate, into a single unit having but one diffuser. In one embodiment of my invention the air and other non-condensable gases and vapors, hereinafter referred to as air, from the condenser are entrained by motive fluid delivered at high velocity by suitable nozzles, and are then discharged with the motive fluid through a combining cone into and through the condensate inlet chamber communicating with the condenser and with a second combining cone. The condensate is entrained by the stream of fluid discharged from the first combining cone and is discharged with the fluids through the second combining cone across a gap and into and through a diffuser. I preferably provide an overflow chamber around the gap between the combining tube and the diffuser and connect it with the interior of the diffuser so that when the ejector is started up the fluids may flow back into the condenser until their velocity is sufficient to cause them to jump across the gap and to pass through the diffuser against the discharge pressure.

In another embodiment of the invention I provide additional nozzles for discharging motive fluid into and through the condensate inlet chamber for the purpose of assisting in the entraining and acceleration of the condensate.

Figure 1:
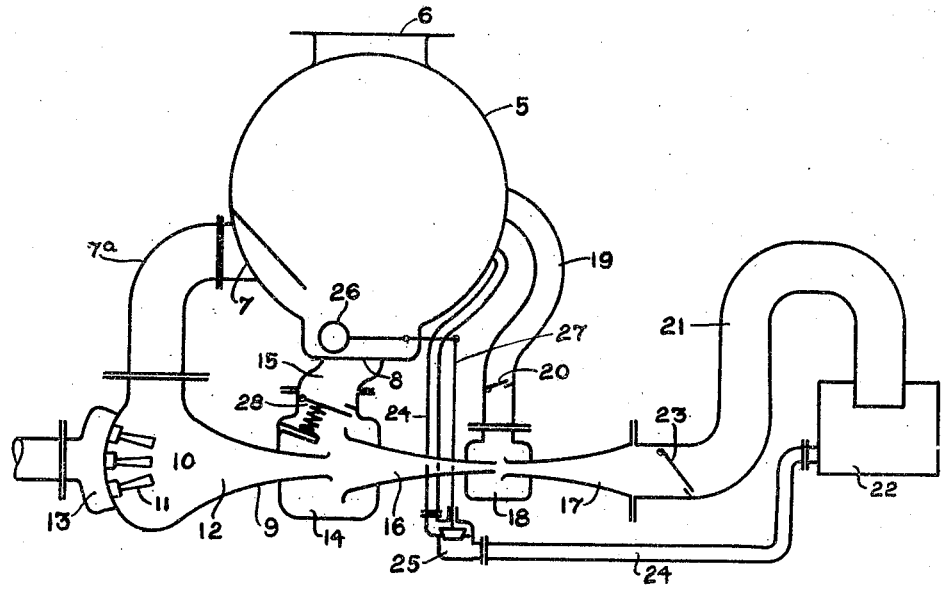
Fig. 1 is a diagrammatic sectional view of a fluid translating device embodying some of the features of my invention.

In Fig. 1, I have illustrated a condenser 5 having an inlet port 6 for fluids to be condensed, hereinafter called steam, an air offtake port 7, and a condensate outlet 8. Below the condenser 5, I have illustrated an ejector 9 having an inlet chamber 10 connected with an air offtake port 7 of the condenser 5 by means of a suitable conduit 7ª. As shown, a series of nozzles 11 extend into the air inlet chamber 10 and are adapted to discharge motive fluid, hereinafter called steam, at high velocity across the inlet chamber 10 and into a converging combining tube 12. A suitable inlet chamber 13 is provided for delivering steam to the nozzles 11.

As illustrated, the combining tube 12 terminates within a condensate inlet chamber 14 which is connected with the condensate outlet 8 of the condenser 5 by means of a passage 15. Axially aligned with the combining tube 12 and open to the condensate inlet chamber 14, I have shown a second converging combining tube 16. The combining tube 16 receives the fluids discharged by the combining tube 12 and the condensate entrained by these fluids in the chamber 14 and, as shown, is adapted to discharge the fluids and the condensate into a diverging diffuser tube 17 which, as shown, is axially aligned with the combining tube 16 and is spaced a short distance away from it.

Enclosing the adjacent ends of the combining tube 16 and the diffuser 17, I show an overflow chamber 18 which is connected with the interior of the condenser 5 by means of an overflow conduit 19. I have illustrated a check valve 20 in this conduit for preventing a return flow of fluids from the condenser to the overflow chamber 18.

As illustrated, the diffuser 17 is connected with a discharge pipe 21 leading to an open tank 22, where the air discharged from the ejector with the condensate may separate from the water and pass off into the atmosphere. I show a check valve 23 in the discharge pipe 21 for the purpose of preventing a flow of fluids into the apparatus in the event of the ejector breaking. By breaking, I mean the failure of the fluids to jump the gap between the combining tube 16 and the diffuser 17.

In order to keep the inlet to the combining tube 16 submerged, I show a pipe 24 for conducting the water from the tank 22 back to the condenser 5. As illustrated, I provide a valve 25 in the pipe 24 adapted to be controlled by a float 26, in the lower part of the condenser, by means of suitable connecting links 27. When the level of the condensate in the condenser falls below a predetermined level, the float 26 opens the valve 25 and a supply of water is received from the tank 22, thereby maintaining the steady operation of the ejector 9.

I illustrate a check valve 28 in the passage 15 between the condenser 5 and the condensate inlet chamber 14 of the ejector for preventing steam and air from backing up into the condenser when starting up the ejector or when the ejector breaks.

In operation, steam is delivered to the nozzles 11 and is discharged at high velocity into and through the inlet chamber 10. The air from the condenser 5 is entrained by the rapidly moving streams of steam from the nozzles and is carried into and through the combining tube 12. The velocity of the fluids is further increased in passing through the converging combining tube 12 and they are then discharged into and through the inlet chamber 14 and into the second combining tube 16. The condensate from the condenser 5 collects in the inlet chamber 14, is entrained by the fluids issuing from the combining tube 12 and is carried with them into and through a second combining tube 16.

When starting up the ejector, the velocity of the condensate and other fluids as they issue from the second combining tube 16 is not sufficient to cause them to jump the gap between the combining tube 16 and the diffuser 17. They are therefore discharged into the chamber 18 and overflow through the conduit 19 into the condenser. As the pressure in the overflow conduit 19 is relatively low, the velocity of the fluids increases until sufficient to cause the fluids to jump the gap between the combining tube 16 and the diffuser 17 and to be discharged from the diffuser against the pressure existing in the discharge conduit 21.

As the ejector illustrated is designed to handle liquid in one of its combining tubes, it is desirable to insure a supply of liquid at all times in order to maintain normal operations of the ejector. In the event of the level of the condensate in the condenser 5 falling below a predetermined point, the float 26 drops sufficiently to open the valve 25 and to thereby allow the liquid to flow into the condenser from the tank 22.

The check valve 28 illustrated in Fig. 1 prevents steam from blowing up into the condenser 5 when the ejector is being started and particularly before the flow of the condensate through the combining tube 16 is established.

Figure 2:
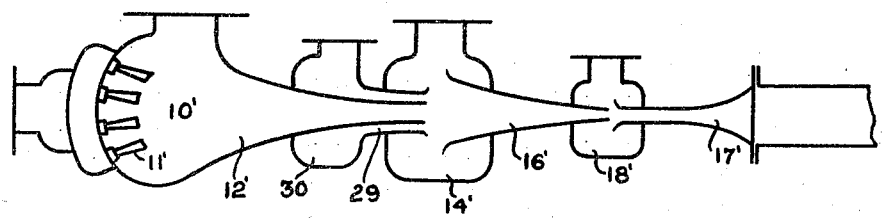
Fig. 2 is a diagrammatic view of a further embodiment of my invention.

In Fig. 2, I illustrate a modification of the ejector illustrated in Fig. 1. As shown, the ejector illustrated in Fig. 2 is provided with an air inlet chamber 10′, nozzles 11′, combining tubes 12′ and 16′, a condensate inlet chamber 14′, an overflow chamber 18′ and a diffuser 17′ all being arranged as in the ejector 9 of Fig. 1. Around the discharge end of the combining tube 12′, I illustrate an annular nozzle 29 for delivering steam at high velocity directly into the condensate inlet chamber 14′ for the purpose of assisting the fluids issuing from the combining tube 12′ in entraining and accelerating the condensate. As shown, the nozzle 29 is supplied with steam by a suitable inlet chamber 30. While I illustrate the nozzle 29 as annular in shape, it will of course be understood that a series of nozzles similar for example to the nozzles 11′ may be arranged around the end of the combining tube 12′ to accomplish the same purpose.

While I have shown my invention in but a single embodiment, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims

What I claim is:

1. The method of ejecting air and condensate from a condenser, which consists in entraining the air in a high velocity jet of steam, intimately mixing the steam and air and discharging the mixture at a high resultant momentum, subjecting the condensate from the condenser to the mixed air and steam to condense the steam and to impart to the condensate a high momentum, maintaining at least a predetermined minimum head of condensate for entrainment in the rapidly moving steam-air mixture, and effecting a thermo-dynamic conversion of the energy of momentum of the air and condensate to pressure energy, whereby the air and condensate may be discharged into a region of atmospheric pressure by reason of the energy conversion.

2. The method of ejecting non-condensable fluids and condensate from a condenser which comprises entraining the non-condensable fluids by means of a high velocity jet of condensable fluid and thereby imparting velocity to the non-condensable fluids and intimately mixing the condensable and non-condensable fluids, subjecting the condensate from the condenser to the action of the rapidly moving mixed fluids to impart the velocity energy of the mixed fluids to the condensate and to condense the condensable fluid, maintaining at least a predetermined minimum head of condensate for entrainment in the rapidly moving steam-air mixture, and effecting a velocity-pressure conversion of the velocity energy of the condensate and non-condensable fluids, whereby the condensate and non-condensable fluids may be discharged into a region of atmospheric pressure by the velocity-pressure conversion of energy.

3. In a condenser installation, an ejector having a plurality of combining tubes receiving air and condensate from the condenser, means for delivering motive fluid to at least one of the combining tubes, a diffuser into which the combining tubes discharge, and means for maintaining a supply of condensate to one of the combining tubes.

4. In a condenser installation, an ejector having a plurality of combining tubes in series with a diffuser and having an overflow port, means for delivering motive fluid to at least one of the combining tubes, and means for connecting the overflow port of the ejector with the interior of the condenser.

5. In combination with a condenser, a combined air and condensate ejector provided with an air inlet port and a condensate inlet port, means for delivering condensate from the condenser to the condensate inlet port, means for subjecting the condensate so delivered to the discharging action of a mixture of expelling motive fluid and air withdrawn from the condenser by the expelling action of the motive fluid, means for maintaining a predetermined minimum head of condensate above said condensate inlet port, and means for effecting a velocity-pressure conversion of the mixed air and condensate, whereby the air and condensate may be discharged to a region of atmospheric pressure by reason of the velocity-pressure conversion.

6. In combination with a condenser having an air offtake port and a condensate discharge port, a two stage ejector comprising an initial stage and a secondary stage, said initial stage consisting of a mixing chamber having an inlet port in communication with the air offtake port of the condenser, a delivery means leading from said mixing chamber, and motive fluid delivery nozzles for delivering expelling motive fluid into and through said mixing chamber and said delivery means, said secondary stage consisting of an inlet chamber having an inlet port through which condensate from the condenser is delivered, means for maintaining a predetermined minimum head of condensate above said condensate inlet port, a diffuser and a port through which combined air and expelling motive fluid is discharged from the initial stage and delivered to the inlet chamber of the secondary stage to impart the velocity energy of the mixed motive fluid and air to the condensate and deliver the commingled condensate, air and condensed motive fluid into the diffuser at a high velocity, whereby the mixed fluids may be discharged to atmospheric pressure by the energy conversion effected in the diffuser.

7. In combination with a condenser having a non-condensable fluid offtake port and a condensate discharge port, a combined condensate and non-condensable fluid ejector comprising an initial and a secondary stage, said initial stage entraining and partially compressing non-condensable fluid withdrawn from the condenser, and said second stage comprising an inlet chamber and a diffuser, said inlet chamber receiving condensate from the condenser and the fluids discharged from the initial stage in such manner as to condense the condensable portions thereof and to impart a resultant velocity to the condensate, means for maintaining a predetermined head of condensate for admission to said inlet chamber, said diffuser receiving the high velocity condensate and non-condensable fluids to effect a velocity-pressure conversion, whereby the mixed fluids may be discharged to the atmosphere by the energy conversion effected in the diffuser.

8. In combination with a condenser, a combined air ejector and condensate ejector, means for entraining air from the condenser in a jet of motive steam delivered into the air ejector, means for delivering condensate from the condenser to the condensate ejector, means for maintaining a predetermined minimum head of condensate for delivery to the condensate ejector, means for delivering the mixed steam and air to the condensate ejector to impart the velocity energy of the mixed steam and air to the condensate, and means for effecting a velocity-pressure conversion of the velocity energy of the mixed fluids, whereby the mixed fluids are discharged into a region of atmospheric pressure by the energy conversion effected within the velocity-energy conversion means.

9. In combination, a condenser, an ejector for withdrawing fluids from the condenser, and means for maintaining at least a minimum level of condensate in the condenser.

10. In combination, a condenser, an ejector for withdrawing fluids from the condenser, and means responsive to the level of condensate in the condenser for maintaining the condensate therein at least at a minimum level.

11. In combination, a condenser, an ejector for withdrawing fluids from the condenser, means permitting a flow of condensate from the condenser to the ejector but prohibiting a reverse flow thereof, and means for maintaining a predetermined level of condensate in the condenser.

12. In combination, a condenser, an ejector for withdrawing fluids from the condenser, and having an entrainment chamber and an overflow chamber, means permitting a flow of condensate from the condenser to the entrainment chamber but prohibiting a reverse flow thereof, means permitting a flow of fluids from the overflow chamber to the condenser but prohibiting a reverse flow thereof, and means for maintaining a predetermined minimum level of condensate in the condenser.

13. In combination, a condenser, an ejector for withdrawing fluids from the condenser and having an entrainment chamber and an overflow chamber, means permitting a flow of condensate from the condenser to the entrainment chamber but prohibiting a reverse flow thereof, means permitting a flow of fluids from the overflow chamber to the condenser but prohibiting a reverse flow thereof, and means for maintaining a supply of condensate to said entrainment chamber.

14. In a condenser installation, an ejector having a plurality of combining tubes receiving air and condensate from the condenser, means for delivering motive fluid to at least one of the combining tubes, a diffuser into which the combining tubes discharge, an overflow port at the inlet of the diffuser, and means for maintaining a supply of condensate to one of the combining tubes.

15. In combination with a condenser, a combined air and condensate ejector comprising a combining tube, means for delivering air from said condenser to said combining tube, a second combining tube into which the first combining tube discharges, means for delivering condensate from said condenser to said second combining tube, a diffuser into which said second combining tube discharges, an overflow leading to the condenser, and means for maintaining the supply of condensate to said second combining tube.

16. In combination, a condenser, an ejector comprising two combining tubes arranged in series, means for delivering fluids from the condenser to the first of said combining tubes, means for delivering liquid from the condenser to the second of said combining tubes, a diffuser into which the combining tubes discharge, and means for returning condensate to the condenser upon a predetermined low level of condensate therein.

17. In combination, a condenser, an ejector comprising two combining tubes arranged in series, means for delivering fluids from the condenser to the first of said combining tubes, means for delivering liquid from the condenser to the second of said combining tubes, a diffuser into which the combining tubes discharge, overflow means for the ejector discharging into the condenser, and means for returning condensate to the condenser upon a predetermined low level of condensate therein.

In testimony whereof, I have hereunto subscribed my name this 28th day of December, 1920.

HENRY F. SCHMIDT.